United States Patent Office 3,134,663
Patented May 26, 1964

3,134,663
HERBICIDAL COMPOSITION AND METHOD EMPLOYING HYDANTOINS
Harry Kroll, Warwick, R.I., assignor to Geigy Chemical Corporation, Ardsley, N.Y., a corporation of Delaware
No Drawing. Filed July 23, 1957, Ser. No. 673,562
14 Claims. (Cl. 71—2.5)

This invention relates to new herbicidally active 1,3-substituted hydantoins. The invention relates further to methods for the preparation of the said substituted hydantoins. Finally, the invention also relates to compositions containing these new hydantoins and which may be used for killing or inhibiting the growth of weeds or undesired plants.

Trisubstituted ureas such as 3-(m-chlorophenyl)-1,1-dimethyl urea have been successfully used as pre- and post-emergence herbicides, but despite the favorable control of such obnoxious weeds as Johnson grass, Bermuda grass, nut grass, and quack grass, these urea derivatives have certain shortcomings when used for controlling weeds in agricultural crops. The major disadvantage of these compounds is their slow rate of decomposition, and their tendency to migrate in the soil to areas other than the immediate zone of application.

It is an object of this invention to provide new herbicidal compounds which can be formulated into compositions to provide effective control of weeds and obnoxious grasses, such as those precedingly mentioned and including broadleaf plantain (*Plantago major*), crabgrass (*Digitaria sanguinalis*), redroot pig weed (*Amaranthus retroflexus*), mustard (Brassica), etc., without imparting to the soil long-lasting herbicidal properties and without injuring desired vegetation, as for example desired cotton, corn, pea or mustard crops.

The compounds of this invention, whereby the said object is realized, may be represented by the following formula:

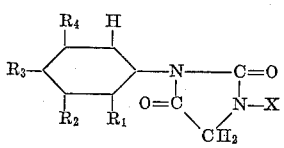

where X is a lower alkyl group (e.g. methyl, ethyl, propyl, butyl, etc.), and $R_1$, $R_2$, $R_3$ and $R_4$ severally signify a hydrogen atom, a halogen atom (e.g. chlorine, bromine or fluorine), a lower alkyl group, a lower alkoxy group, a lower haloalkyl group, a lower alkyl amino group or a nitro group. The aromatic constituent of the 1,3-substituted hydantoin contains a hydrogen on at least one carbon atom ortho to the adjacent nitrogen of the hydantoin ring.

These 1,3-substituted hydantoins are inter alia readily prepared by the action of aqueous or alcoholic hydrochloric acid on the corresponding 1,3-substituted ureas. The hydantoins prepared from herbicidally active ureas having the 3-aryl-1-alkyl-1-cyanomethyl urea structure retain their herbicidal activity in the hydantoin structure.

The hydantoin formation may be illustrated by the following equation:

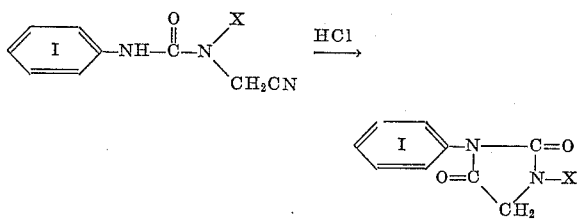

In this equation, the starting nucleus I may be substituted ($R_1$, $R_2$, $R_3$ and $R_4$) as hereinbefore indicated, and these substituents are carried over to the corresponding product nucleus I, X being lower alkyl as previously indicated.

The conversion of the substituted urea to the hydantoin is advantageously accomplished by mixing the nitrile with aqueous hydrochloric acid and heating the mixture to reaction temperature. The 1-alkyl-3-aryl-hydantoins are obtained in pure form and high yields. The unexpected retention of the herbicidal properties of the cyanomethyl ureas on conversion to the corresponding hydantoin thus results in another new class of compounds having herbicidal or phytohormone properties.

The following hydantoins are illustrative of those within the scope of this phase of the invention:

1-methyl-3-(o-chlorophenyl)-hydantoin;
1-methyl-3-(p-chlorophenyl)-hydantoin;
1-methyl-3-(m-chlorophenyl)-hydantoin;
1-methyl-3-phenyl-hydantoin;
1-methyl-3-(3,4-dichlorophenyl)-hydantoin;
1-methyl-3-(2,5-dichlorophenyl)-hydantoin;
1-methyl-3-(p-nitrophenyl)-hydantoin;
1-methyl-3-(2,4-dichlorophenyl)-hydantoin;
1-methyl-3-(2,4,5-trichlorophenyl)-hydantoin;
1-ethyl-3-(m-chlorophenyl)-hydantoin;
1-sec.propyl-3-(3,4-dichlorophenyl)-hydantoin;
1-tert.butyl-3-phenyl-hydantoin;
1-methyl-3-(3-chloro-4-methylphenyl)-hydantoin;
1-methyl-3-(m-tolyl)-hydantoin;
1-methyl-3-(p-tolyl)-hydantoin;
1-methyl-3-(3,4-dimethylphenyl)-hydantoin;
1-sec.propyl-3-(p-chlorophenyl)-hydantoin;
1-methyl-3-(p-methoxyphenyl)-hydantoin;
1-methyl-3-(2,5-dimethoxyphenyl)-hydantoin;
1-methyl-3-(3-trifluoromethyl-4-chlorophenyl)-hydantoin;
1-methyl-3-(p-fluorophenyl)-hydantoin;
1-methyl-3-(p-dimethylaminophenyl)-hydantoin; etc.

The new compounds can be applied to the weeds to be eradicated and/or to the soil to be kept free of weeds, in a variety of ways, but preferably in association with a carrier. Thus, an active compound of the invention may be associated in finely-divided form with a dust-forming auxiliary, such as talc, fuller's earth or the like, the resultant composition being applied as a dust. Alternatively the active compound may be associated with a dispersing agent or mixture which is dispersible in water, whereby the admixed component according to the invention may be applied in spray form (e.g. as an aqueous suspension). The active compound may also be used in solution in an appropriate solvent. In each case, the composition as used contains an effective quantity or proportion of active compound.

Representative presently-preferred embodiments of the present invention are set forth in the following illustrative examples wherein the parts and percentages are by weight.

EXAMPLE 1

*1-Methyl-3-(3,4-Dichlorophenyl)-Hydantoin*

Thirty parts of 3-(3,4-dichlorophenyl)-1-methyl-1-cyanomethylurea in 150 parts of 6-normal hydrochloric acid are heated to reflux for three hours. The reaction mixture is cooled overnight and a white crystalline product precipitated. The product is separated and dried in a vacuum desiccator over KOH. The yield is 28 parts (90% of theoretical). Recrystallization of the product results in the recovery of a white crystalline solid which melts at 140.5–152.5° C.; it is 1-methyl-2-(3,4-dichlorophenyl)-hydantoin.

EXAMPLE 2

*1-Methyl-3-(o-Chlorophenyl)-Hydantoin*

A mixture of 10 parts of 3-(o-chlorophenyl)-1-methyl- 1-cyanomethyl urea and 50 parts of 6-normal hydrochloric acid is refluxed for 2 hours. The mixture is cooled in the refrigerator overnight and with scratching and cooling the product—1-methyl-3-(o-chlorophenyl) - hydantoin— crystallizes out. The yield is 8 parts, after recrystallizing from carbon tetrachloride. M.P. 108–109° C.

EXAMPLE 3

1-Methyl-3-(p-Chlorophenyl)-Hydantoin

To 30 parts of 3-(p-chlorophenyl)-1-methyl-1-cyanomethylurea is added 150 parts of 6-normal hydrochloric acid and the mixture allowed to reflux for 2 hours. The mixture is then cooled in the refrigerator overnight and the solid formed is filtered. The product recrystallized from carbon tetrachloride yields 28 parts of 1-methyl-3-(p-chlorophenyl)-hydantoin. M.P. 119–120° C.

Alternatively, a mixture of 10 parts of 3-(p-chlorophenyl)-1-methyl-1-carbethoxymethylurea and 50 parts of 6-normal hydrochloric acid is refluxed for one hour and the reaction mixture cooled to room temperature. The product, 1-methyl-3-(p-chlorophenyl)-hydantoin, crystallizes readily on cooling, and the white solid formed is filtered and dried. The yield is 8–9 parts (100%). M.P. 117.5–118.5° C.

EXAMPLE 4

1-Methyl-3-(m-Chlorophenyl)-Hydantoin

A solution of 30 parts of 3-(m-chlorophenyl)-1-methyl-1-cyanomethylurea in 150 parts of 6-normal hydrochloric acid is allowed to reflux for 3 hours. The mixture is allowed to cool in the refrigerator overnight and the solid that separates is filtered. The so-obtained slightly colored solid is recrystallized from carbon tetrachloride yielding 25 parts of the desired product, 1-methyl-3-(m-chlorophenyl)-hydantoin. M.P. 84–86° C.

EXAMPLE 5

1-Methyl-3-(2,4,5-Trichlorophenyl)-Hydantoin

Ten parts of 3-(2,4,5-trichlorophenyl)-1-methyl-1-cyanomethyl urea are dissolved in 50 parts of 6-normal hydrochloric acid. This mixture is warmed to reflux for 3 hours. On cooling, a 85% yield of 1-methyl-3-(2,4,5-trichlorophenyl)-hydantoin separates as a white crystalline product.

EXAMPLE 6

1-Methyl-3-(2,4-Dichlorophenyl)-Hydantoin

A mixture of 35 parts of 3-(2,4-dichlorophenyl)-1-methyl-1-cyanomethylurea and 175 parts of 6-normal hydrochloric acid is refluxed for 2 hours and the reaction mixture then cooled to room temperature (about 20° to about 30° C.). The reaction mixture is diluted somewhat with water, warmed on the steam bath, and cooled several days in the refrigerator. The product, 1-methyl-3-(2,4-dichlorophenyl)-hydantoin, crystallizes slowly from a white syrup to a white solid, with scratching. The solid is filtered, ground up and washed well with water and dried in vacuo. The yield is 34 parts (96.5% of theory); M.P. 97–98° C. On recrystallization from isopropanol the product melts at 99–100° C.

EXAMPLE 7

1-Methyl-3-(2,5-Dichlorophenyl)-Hydantoin

A mixture of 53 parts of 5-(2,5-dichlorophenyl)-3-methyl-hydantoic acid—prepared e.g. from 2,5-dichlorophenyl isocyanate and sarcosine in the presence of potassium hydroxide—and 265 parts of 6-normal hydrochloric acid is refluxed for one hour and the reaction mixture then cooled to room temperature. The reaction mixture is then treated as described in Example 6. The product, 1-methyl-3-(2,5-dichlorophenyl)-hydantoin, crystallizes readily from a white syrup to a white solid. The yield is 43.5 parts (88%). M.P. 115–123° C. On recrystallization from carbon tetrachloride, the product melts at 120–121.5° C.

EXAMPLE 8

1-Methyl-3-(m-Tolyl)-Hydantoin

To 35 parts of crude 3-(m-tolyl)-1-methyl-1-cyanomethylurea is added a solution of 107 parts of concentrated hydrochloric acid in 87 parts of ethanol and the mixture is allowed to reflux for 1½ hours. The reaction mixture is cooled and evaporated to dryness in vacuo at 50–60° C. The residue is dried in vacuo over alkali and then taken up in 30 parts of ethanol, and the insoluble ammonium chloride is filtered off. The ethanol filtrate is evaporated to dryness at 50–60° C. in vacuo, and the syrupy residue is treated with 50 parts of water and warmed on the steam bath. The product, 1-methyl-3-(m-tolyl)-hydantoin, which crystallizes slowly on cooling in ice and scratching is filtered, washed well with water, and dried in vacuo. The yield is 27 parts (77%). M.P. 48–52° C.

EXAMPLE 9

1-Methyl-3-(p-Tolyl)-Hydantoin

A mixture of 36 parts of 3-(p-tolyl)-1-methyl-1-cyanomethylurea and 184 parts of 6-normal hydrochloric acid is refluxed for 2 hours and the reaction mixture cooled. The product crystallizes spontaneously with scratching. The white solid formed which is the desired 1-methyl-3-(p-tolyl)-hydantoin, is filtered, washed well with water, and dried in vacuo. The yield is 30 parts (83%). M.P. 114–117° C.

EXAMPLE 10

1-Methyl-3-(3,4-Dimethylphenyl)-Hydantoin 3-(3,4-dimethylphenyl) - 1 - methyl-1-cyanomethylurea (46.5 parts) is treated with 233 parts of 6-normal hydrochloric acid according to the procedure described in Example 9. The yield of the white, crystalline 1-methyl-3-(3,4-dimethylphenyl)-hydantoin is 43 parts (92%). M.P. 97–99° C.

EXAMPLE 11

1-Sec.Propyl-3-(p-Chlorophenyl)-Hydantoin 3-(p-chlorophenyl) - 1 - sec.propyl - 1-cyanomethylurea (42 parts) is treated with 210 parts of 6-normal hydrochloric acid according to the procedure described in Example 9. The yield of the white, crystalline 1-sec.propyl-3-(p-chlorophenyl)-hydantoin is 40 parts (95%). M.P. 100–107° C. On recrystallization from aqueous ethanol the product melts at 107–109° C.

EXAMPLE 12

1-Sec.Propyl-3-(3,4-Dichlorophenyl)-Hydantoin

Crude 3-(3,4-dichlorophenyl) - 1 - sec.propyl-1-cyanomethylurea (73.5 parts) is treated with 350 parts of 6-normal hydrochloric acid according to the procedure described in Example 9. The yellowish-white, crystalline 1-sec.propyl-3-(3,4-dichlorophenyl)-hydantoin is further purified by solution in 175 parts of ethanol, filtration and washing with ethanol, and reprecipitation with 300 parts of water added in portions with shaking. The yield of product, after filtration and drying, is 60.5 parts (82%). M.P. 72–78° C. On recrystallization from aqueous ethanol the product melts at 77–78° C.

EXAMPLE 13

1-Methyl-3-(p-Methoxyphenyl)-Hydantoin 3-(p-methoxyphenyl)-1-methyl-1-cyanomethylurea (45 parts) is treated with 225 parts of 6-normal hydrochloric acid according to the procedure described in Example 9. The yield of the white, crystalline 1-methyl-3-(p-methoxyphenyl)-hydantoin is 31 parts (68.5%). M.P. 117–120° C.

EXAMPLE 14

1-Methyl-3-(2,5-Dimethoxyphenyl)-Hydantoin 3-(2,5-dimethoxyphenyl) - 1 - methyl-1-cyanomethylurea (43 parts) is treated with 215 parts of 6-normal hydrochloric acid according to the procedure described in Example 9. The yield of the white crystalline 1-methyl-3-(2,5-dimethoxyphenyl)-hydantoin is 29 parts (67%). M.P. 133–136.5° C.

EXAMPLE 15

*1-Methyl-3-(3-Trifluoromethyl-4-Chlorophenyl)- Hydantoin*

A mixture of 40 parts of 3-(3-trifluoromethyl-4-chlorophenyl)-1-methyl-1-cyanomethylurea and 300 parts of 3-normal hydrochloric acid is refluxed for 1½ hours. The product, an oil at first, crystallizes with scratching while the reaction mixture is still warm. The white solid formed, which is the desired 1-methyl-3-(3-trifluoromethyl-4-chlorophenyl)-hydantoin, is filtered, ground up and washed well with water, and dried in vacuo. The yield in 36 parts (89.5%). M.P. 93–100° C.

EXAMPLE 16

*1-Methyl-3-(p-Fluorophenyl)-Hydantoin*

3-(p-fluorophenyl)-1-methyl-1-cyanomethylurea (12.5 parts) is treated with 94 parts of 3-normal hydrochloric acid according to the procedure described in Example 15. The yield of the white, crystalline 1-methyl-3-(p-fluorophenyl)-hydantoin is 11 parts (87.5%). M.P. 135–136° C.

EXAMPLE 17

*1-Methyl-3-(p-Dimethylaminophenyl)-Hydantoin*

A solution of 11 parts of 3-(p-dimethylaminophenyl)-1-methyl-1-cyanomethylurea in 82.5 parts of 3-normal hydrochloric acid is refluxed for one hour and the reaction mixture then cooled to room temperature. The clear solution is neutralized with 6-normal sodium hydroxide to a pH of 8. The precipitated white solid 1-methyl-3-(dimethylaminophenyl)-hydantoin is filtered, washed well with water and dried in vacuo. The yield is 10 parts (90.5%). M.P. 154–155° C. Neutral equivalent: 234.

EXAMPLE 18

This example is illustrative of a method of using the compounds of the present invention.

A newly-seeded cotton patch is sprayed—advantageously on the day after seeding—with an aqueous dispersion of 1-methyl-3-(p-chlorophenyl)-hydantoin at a dosage rate of about 4 pounds of active urea per acre. Any weeds, such as crabgrass, broadleaf plantain, redroot pigweed or the like, which sprout will be effectively destroyed and completely eradicated within a period of 14 to 28 days. Emergent cotton will be and will remain totally unharmed at this effective weed-controlling dosage level.

Other active compounds of the invention—e.g. 1-methyl-3-(3,4-dichlorophenyl)-hydantoin, etc.—may be used in lieu of the 1-methyl-3-(p-chlorophenyl)-hydantoin with essentially the same results.

Effective control may also be realized with dosages as low as 2 pounds of active compound per acre. Even a dosage rate as low as 1 pound per acre may achieve a 75%–90% destruction of weeds within 28 days.

The cotton remains unharmed throughout.

EXAMPLE 19

The specificity of the new compounds of this invention is illustrated by their ability to kill e.g. mustard (Brassica), a very common weed in many crops, and not damage e.g. corn or peas. In contrast to these new substances, known herbicides such as 3-(p-chlorophenyl)-1,1-dimethylurea will destroy the crop plants as well as the weeds.

Ten seeds each of corn, peas and mustard are planted in soil flats at a depth of 3 centimeters. The flats are then sprayed with a dispersion of the test compounds at a dosage rate of 10 pounds of active ingredient per acre. A count of plant stand is taken after 28 days. The tests are performed in duplicate and the table below lists the average values.

| Compound | Percentage of Plants Killed | | |
|---|---|---|---|
| | Corn | Peas | Mustard |
| A | 0 | 0 | 100 |
| B | 100 | 100 | 100 |

A=3-(3,4-dichlorophenyl)-1-methyl-hydantoin
B=3-(p-chlorophenyl)-1,1-dimethylurea.

Having thus disclosed the invention what is claimed is:

1. A method of preventing the growth of undesired vegetation which comprises treating said vegetation with a herbicidal quantity of a hydantoin derivative of the formula

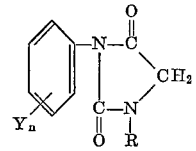

wherein Y is a member of the group consisting of hydrogen, halogen nitro, lower dialkylamino, trifluoromethyl, lower alkoxy and lower alkyl, $n$ is an integer of 1 to 2, and R is methyl.

2. A method of preventing the growth of undesired vegetation which comprises treating said vegetation with a herbicidal quantity of 1-methyl-3-(phenyl)-hydantoin.

3. A composition for inhibiting the growth of plants, consisting essentially of 1-methyl-3-(3,4-dichlorophenyl)-hydantoin in a concentration sufficient to inhibit plant growth, and an agricultural adjuvant as carrier therefor selected from the group consisting of talc and fuller's earth.

4. A composition for inhibiting the growth of plants, consisting essentially of 1-methyl-3-(p-chlorophenyl)-hydantoin in a concentration sufficient to inhibit plant growth, and an agricultural adjuvant as carrier therefor selected from the group consisting of talc and fuller's earth.

5. A composition for inhibiting the growth of plants, consisting essentially of 1-isopropyl-3-(p-chlorophenyl)-hydantoin in a concentration sufficient to inhibit plant growth, and an agricultural adjuvant as carrier therefor selected from the group consisting of talc and fuller's earth.

6. A composition for inhibiting the growth of plants, consisting essentially of 1-methyl-3-(p-tolyl)-hydantoin in a concentration sufficient to inhibit plant growth, and an agricultural adjuvant as carrier therefor selected from the group consisting of talc and fuller's earth.

7. A composition for inhibiting the growth of plants, consisting essentially of 1-methyl-3-(p-methoxyphenyl)-hydantoin in a concentration sufficient to inhibit plant growth, and an agricultural adjuvant as carrier therefor selected from the group consisting of talc and fuller's earth.

8. A composition for inhibiting the growth of plants, consisting essentially of 1-methyl-3-(p-fluorophenyl)-hydantoin in a concentration sufficient to inhibit plant growth, and an agricultural adjuvant as carrier therefor selected from the group consisting of talc and fuller's earth.

9. A method for inhibiting plant growth, which comprises bringing 1-methyl-3-(3,4-dichlorophenyl)-hydantoin into contact with the plant in an amount sufficient to inhibit growth of the plant.

10. A method for inhibiting plant growth, which comprises bringing 1-methyl-3-(p-chlorophenyl)-hydantoin into contact with the plant in an amount sufficient to inhibit growth of the plant.

11. A method for inhibiting plant growth, which comprises bringing 1-isopropyl-3-(p-chlorophenyl)-hydantoin into contact with the plant in an amount sufficient to inhibit growth of the plant.

12. A method for inhibiting plant growth, which comprises bringing 1-methyl-3-(p-tolyl)-hydantoin into contact with the plant in an amount sufficient to inhibit growth of the plant.

13. A method for inhibiting plant growth, which comprises bringing 1-methyl-3-(p-methoxyphenyl)-hydantoin into contact with the plant in an amount sufficient to inhibit growth of the plant.

14. A method for inhibiting plant growth, which comprises bringing 1-methyl-3-(p-fluorophenyl)-hydantoin into contact with the plant in an amount sufficient to inhibit growth of the plant.

References Cited in the file of this patent

UNITED STATES PATENTS

| 2,538,024 | McKinney et al. | Jan. 16, 1951 |
| 2,551,134 | Bradshaw | May 1, 1951 |
| 2,553,055 | Livak | May 15, 1951 |
| 2,669,575 | Solonen et al. | Feb. 16, 1954 |
| 2,688,023 | Rogers | Aug. 31, 1954 |

OTHER REFERENCES

Cocker: Chem. Abstracts, vol. 32, col. 496 (1938).

Huang et al.: Chem. Abstracts, vol. 42, col. 4941 (1948).

Cook et al.: Chem. Abstracts, vol. 44, col. 1970 (1950).

Ware in "Chemical Review," vol. 46, pages 403 to 470, June 1950, (pages 413, 427, 455 particularly relied on).

Cook et al.: Chem. Abstracts, vol. 47, col. 8737 (1953).